United States Patent [19]
Sano

[11] Patent Number: 5,276,829
[45] Date of Patent: Jan. 4, 1994

[54] DATA PROCESSING SYSTEM INCLUDING CACHE MEMORY FOR RAPIDLY CONVERTING A LOGICAL ADDRESS INTO A PHYSICAL ADDRESS USING SHARED MEMORY FLAG

[75] Inventor: Yoshinobu Sano, Fuchu, Japan

[73] Assignee: Kabushiki Kaisha Toshiba, Kawasaki, Japan

[21] Appl. No.: 359,281

[22] Filed: May 31, 1989

[30] Foreign Application Priority Data

May 31, 1988 [JP] Japan ............................ 63-132982

[51] Int. Cl.$^5$ .......................................... G06F 12/06
[52] U.S. Cl. .............................. 395/425; 364/243.3; 364/254.3; 364/255.5; 364/255.1; 364/DIG. 1
[58] Field of Search ............... 395/425; 364/200, 900

[56] References Cited

U.S. PATENT DOCUMENTS

| | | | |
|---|---|---|---|
| 4,622,631 | 11/1986 | Frank | 364/200 |
| 4,742,450 | 5/1988 | Duvall | 364/200 |
| 4,843,542 | 6/1989 | Dashiell | 364/200 |
| 4,939,641 | 7/1990 | Schwartz | 364/200 |

*Primary Examiner*—Robert B. Harrell
*Assistant Examiner*—Eric Coleman
*Attorney, Agent, or Firm*—Cushman, Darby & Cushman

[57] ABSTRACT

In a data processing system including a logical address cache memory device, a plurality of logical address areas are assigned to a shared physical address area. A shared memory flag representing whether the physical address area represented by each address conversion information is part of the shared memory area is added to the address conversion information used in address conversion by the physical address coincidence detection mechanism. When a cache miss is detected in the logical address cache memory device, the physical address coincidence detection mechanism performs first address conversion for converting a predetermined field of the logical address required upon a main memory access request into an upper physical address. When the shared memory flag of the address conversion information used in the first address conversion is true, the physical address coincidence detection mechanism performs second address conversion for converting an address tag of tag information read out from the main memory into an upper physical address during cache memory access upon a main memory access request, and detection of a coincidence between the first and second address conversion results.

17 Claims, 3 Drawing Sheets

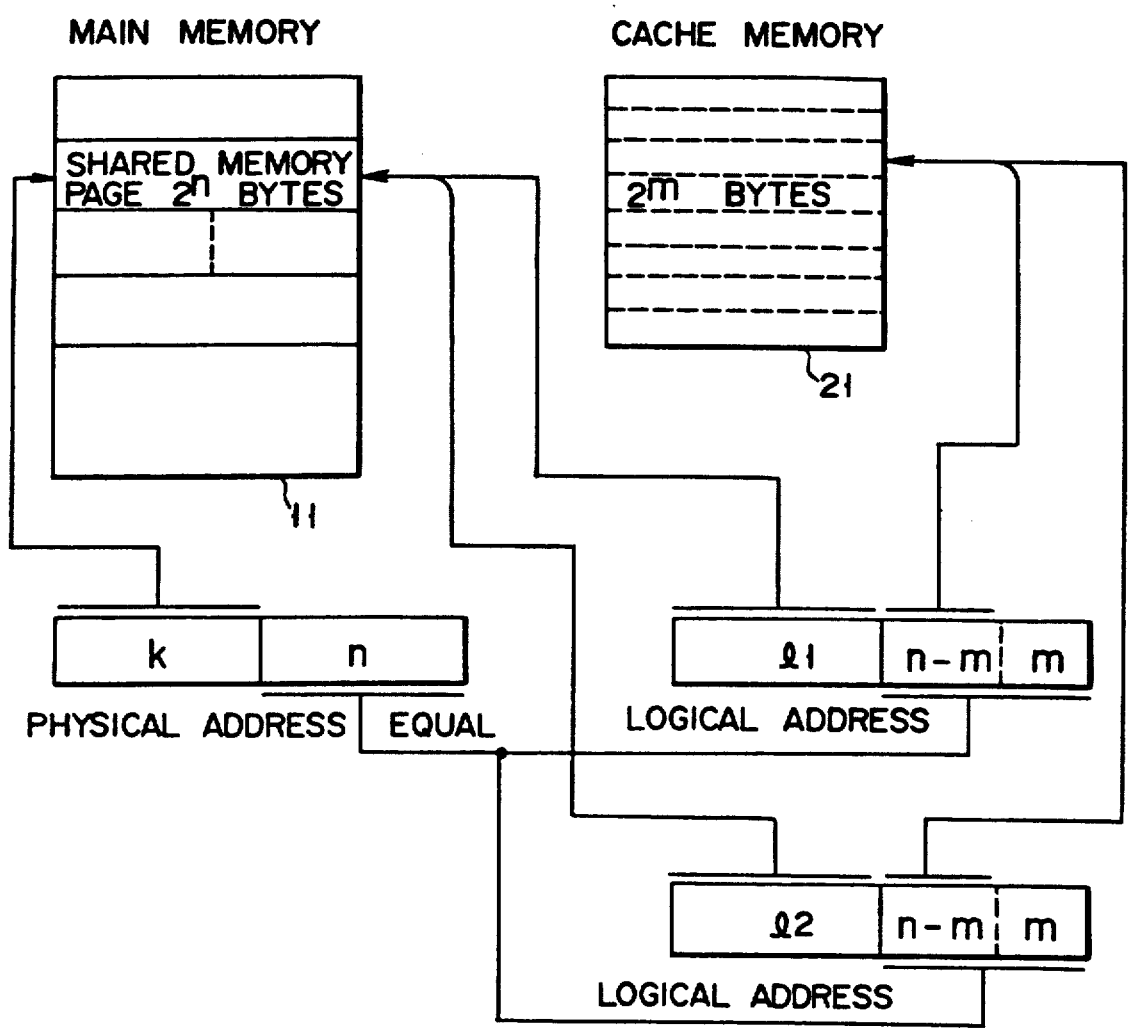
F I G. 2

DATA PROCESSING SYSTEM INCLUDING CACHE MEMORY FOR RAPIDLY CONVERTING A LOGICAL ADDRESS INTO A PHYSICAL ADDRESS USING SHARED MEMORY FLAG

BACKGROUND OF THE INVENTION

1. Field of the Invention

The present invention relates to a data processing system, including a cache memory device and a shared memory area in a main memory, for converting a logical address into a physical address at high speed.

2. Discussion of the Prior Art

A conventional logical address cache memory device includes a cache data memory and a cache tag memory. The cache data memory stores a copy of a part of data stored in a main memory in units of blocks. The cache tag memory stores tag information associated with the data block. The tag information includes an address tag representing a logical address area assigned to a main memory physical address area corresponding to each data block stored in the cache data memory.

In a conventional logical address cache memory device, when a logical address for accessing a main memory is output from a CPU, the cache tag memory is accessed in accordance with the logical address, and an address tag corresponding to this logical address is retrieved. If the corresponding address tag is present in the cache tag memory and a cache hit occurs, the corresponding data block is read out from the cache data memory.

In a conventional data processing system including the above logical address cache memory device, a plurality of different logical addresses are often assigned to a given physical address area having a predetermined size in the main memory, i.e., a shared physical address area is often present. In this case, alias restriction is required. The alias restriction is defined such that lower n bits (n is determined on the basis of a capacity $2^n$ bytes of the cache data memory) of a logical address associated with a physical address representing a shared physical address area of the main memory (to be referred to as a lower logical address hereinafter) are set to coincide with lower n bits of the physical address (to be referred to as a lower physical address hereinafter). In this manner, the main memory is managed in units of $2^n$ bytes. In this case, upper bits except for the lower n bits of the logical address (to be referred to as an upper logical address) are used as an address tag of the cache tag memory.

In the data processing system having a shared memory area under the alias restriction, assume that a cache miss is detected in the logical address cache memory device in response to a main memory access request from a CPU. If the logical address area corresponding to the logical address to be accessed and the logical address area corresponding to the address tag obtained through the logical address are assigned to the same physical address area (shared memory area), even though the cache miss is detected, the object data block is stored in the cache data memory. In this case, it is wasteful to access the main memory as in the normal cache miss. Therefore, this data processing system generally includes a physical address coincidence detection mechanism to check if the above two logical address areas are assigned to the same physical address area.

A conventional physical address coincidence detection mechanism is always started upon detection of a cache miss in a logical address cache memory device. The upper logical address except for the lower logical address of the logical address to be accessed, and the address tag used for cache miss determination and output from the cache tag memory are converted into corresponding upper physical addresses, each of which is an upper address bit except for the lower physical address. The physical address coincidence detection mechanism detects whether the generated physical addresses coincide with each other. If no coincidence is determined, the main memory is accessed. However, when a coincidence between these physical addresses is detected, the object data block is stored in the cache data memory. Therefore, the cache data block from the cache data memory is used substantially as in a cache hit, and main memory access is inhibited. According to this system, when both the physical addresses coincide with each other, high-speed processing can be performed as compared with a system for unconditionally accessing the main memory upon detection of a cache miss. However, two logical/physical address conversion operations must be performed upon every cache miss. Therefore, when both the physical addresses do not coincide with each other, the processing speed is lowered as compared with the system for unconditionally accessing the main memory.

SUMMARY OF THE INVENTION

The present invention has been made in consideration of the above situation, and has as its object to provide a data processing system for inhibiting the two address conversion operations of a physical address coincidence detection mechanism when it becomes certain that two physical addresses associated with two address conversion operations do not coincide with each other, and for preventing unnecessary address conversion operations, thereby accessing a main memory at high speed.

The data processing system includes a main memory for storing data blocks, the main memory including a plurality of memory areas each having a first size, each memory area being assigned with one physical address area, and at least one of the plurality of physical address areas being assigned as a shared memory area with a plurality of logical address areas. An address converting section converts an input first logical address into the first physical address. A first determining section determines whether a first physical address area which includes the first physical address corresponds to a shared memory area. A cache section has a cache data memory for storing a plurality of cache data blocks and a cache tag memory for storing a plurality of tag information blocks respectively associated with the cache data blocks. The cache section determines whether a cache hit occurs between the first logical address and a second logical address from a first tag information block associated with the first logical address. An access section accesses the main memory in accordance with the first physical address when the cache hit is not determined by the cache section and the first physical address area is determined not to correspond to the shared memory area.

According to the data processing memory of the present invention, when a shared memory flag in the address conversion information obtained by the first logical/physical address conversion operation is not true, even if a cache hit is not determined, the physical address area assigned with the logical address area including the logical address is determined not to correspond to the shared memory area, and the second logical/physical address conversion operation is inhibited. This also applies to a case wherein the shared memory flag in tag information read out from the cache tag memory upon occurrence of a cache miss is not true. Therefore, unlike the conventional system, the second logical/physical address conversion operation and a coincidence detection operation of the physical address coincidence detection mechanism are inhibited, and therefore the processing speed is not lowered.

BRIEF DESCRIPTION OF THE DRAWINGS

FIG. 2 is a view showing a relationship between a logical address and a physical address and a relationship between a main memory and a cache data memory.

DETAILED DESCRIPTION OF THE PREFERRED EMBODIMENT

A data processing system according to an embodiment of the present invention will be described with reference to the accompanying drawings.

Figure 1:
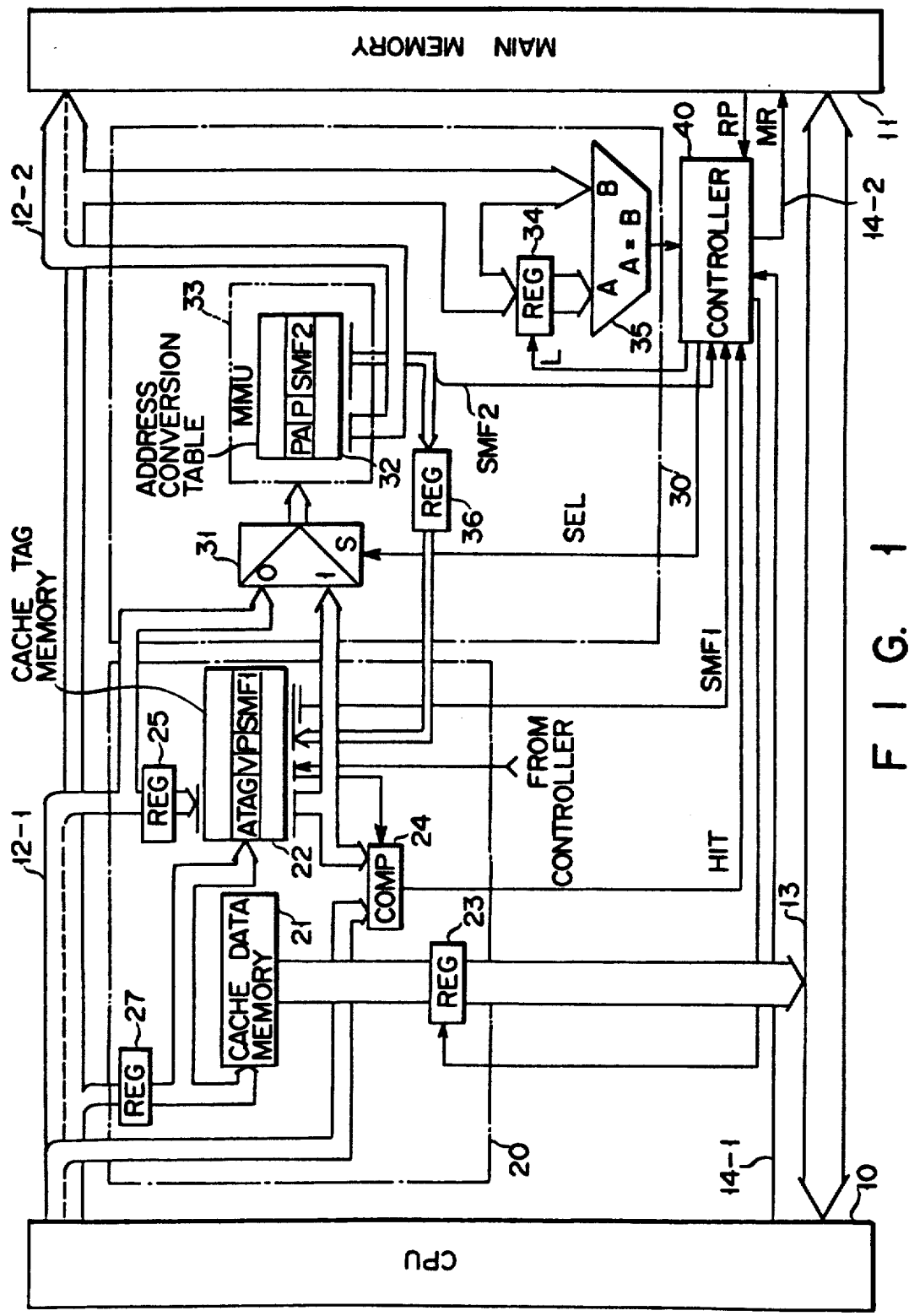
FIG. 1 is a block diagram showing an arrangement of a data processing system according to an embodiment of the present invention.

First, an arrangement of the data processing system will be described with reference to FIG. 1. Referring to FIG. 1, the data processing system includes a data bus 13, address buses 12-1 and 12-2, control buses 14-1 and 14-2, a CPU 10, a logical address cache memory device 20, a main memory 11, a physical address coincidence mechanism 30, and a controller 40.

The CPU 10 outputs a logical address onto the address bus 12-1 and read control data onto the control bus 14-1 to read-access the main memory 11, and receives a data block associated with the logical address through the data bus 13. As shown in FIG. 2, the main memory 11 is managed in units of $2^n$-byte data blocks. A physical address area is designated by upper k bits (to be referred to an upper physical address hereinafter) of the physical address. A plurality of logical address areas are assigned to at least one of the physical address areas. This physical address area is shared, and this physical address area serves as a shared memory area. The logical address area is accessed by upper l bits (to be referred to as an upper logical address hereinafter) except for the lower n bits (to be referred to as a lower logical address) of the logical address. The lower n bits (to be referred to as a lower logical address) of the physical address representing a relative address position within the physical address area coincide with the lower logical address of the logical address corresponding to the physical address.

The upper (n−m) bits of the lower logical address of the logical address output from the CPU 10 onto the address bus 12-1 are latched by a register 27, and the upper logical address is latched by a register 25. The logical address cache memory device 20 connected to the address bus 12-1 includes a cache data memory 21, a cache tag memory 22, a register 23, the registers 25 and 27, and a comparator 24. The capacity of the cache data memory 21 is $2^n$ bytes and stores $2^{n-m}$ $2^m$-byte cache data blocks. That is, the cache data memory 21 has $2^{n-m}$ entries. The cache data block of each entry corresponds to a data block stored in the main memory 11. The read/write mode of the logical address cache memory device 20 is controlled by the controller 40. In the read mode, a cache data block stored in the entry accessed by the address latched by the register 27 is read out from the cache data memory 21 and latched by the register 23. In the write mode, a data block latched by the register 23 is written in the entry accessed by the address latched by the register 27.

The number of entries of the cache tag memory 22 is the same as that of the cache data memory 21, and tag information is stored in each entry. Each tag information corresponds to the cache data block stored in the corresponding entry of the cache data memory 21. The tag information includes an address tag ATAG, a valid bit V, main memory protection information P, a shared memory flag SMF1. The address tag ATAG represents the upper logical address associated with the cache data block in the cache data memory 21 which corresponds to the tag information. The valid bit V represents whether the address tag ATAG is valid. The main memory protection information P is information well-known to those skilled in the art. The shared memory flag SMF1 represents whether the physical address area assigned with the logical address area represented by the address tag ATAG is a shared memory area. In the read mode, when the address latched by the register 27 is output, the tag information stored in the entry accessed by this address is output. The address tag ATAG and the valid bit V of the tag information are supplied to the comparator 24. The flag SMF1 is supplied to the controller 40. In the write mode, the upper physical address output from CPU10 and latched by the register 25, a valid bit V supplied from the controller 40, main memory protective information P supplied and a shared memory flag SMF2 from the physical address coincidence detection mechanism 30 are stored as the address tag ATAG, the valid bit V, the main memory protective information P, and the shared memory flag SMF1 in an entry designated by the address latched by the register 27.

The comparator 24 compares the upper logical address on the address bus 12-1 with the address tag ATAG from the tag memory 22. If a coincidence is established, the comparator 24 outputs a hit signal HIT of logic "1". However, if a coincidence is not established, the hit signal HIT is set at logic "0". The signal HIT is supplied to the controller 40.

The physical address coincidence detection mechanism 30 includes a selector 31, a memory management unit (MMU) 33 having an address conversion table 32, registers 34 and 36, and a comparator 35. The "0" input of the selector 31 receives the upper logical address from the address bus 12-1, and the "1" input of the selector 31 receives the address tag ATAG from the cache tag memory 22. The selector 31 selects one of the inputs supplied to the "1" and "0" inputs in accordance with a selection control signal SEL from the controller 40, and the selected input is output to the MMU 33.

The MMU 33 refers to the address conversion table 32 by using the upper logical address output from the selector 31 as an entry and retrieves the corresponding physical address information. The address conversion table 32 has a plurality of entries which can be accessed by the upper logical addresses. Each entry stores physical address information including the upper physical address PA, the main memory protection information P, and the shared memory flag SMF2. The upper physical address PA represents a physical address area of the main memory 11 which corresponds to the logical address area represented by the upper logical address selected by the selector 31. The main memory protection information P is the same as that in the tag information stored in the cache tag memory 22. The flag SMF2 represents whether the physical address area represented by the upper physical address PA is a shared memory area. More specifically, when the flag SMF2 is set at logic "1", it represents that the physical address area is a shared memory area as in the flag SMF1. Otherwise, it represents that the physical address area is not a shared memory area. The flag SMF2 is set under the control of an operating system (OS). The upper physical address PA of the retrieved physical address information is output onto the address bus 12-2. The upper physical address PA is linked with the lower logical address on the address bus 12-2 which is the same as that on the address bus 12-1 to form a physical address. The flag SMF2 and the main memory protection information P are latched by the register 36 and are output to the logical address cache memory device 20 in response to a control signal from the controller 40 when the logical address cache memory device 20 is set in the write mode. The flag SMF2 is also output to the controller 40.

The register 34 latches the physical address from the address bus 12-2 in accordance with a timing control signal L from the controller 40. The latched physical address is supplied to the A input of the comparator 35. The latched physical address is also output onto the address bus 12-2 in accordance with the signal L from the controller 40. A next physical address is input from the address bus 12-2 to the B input of the comparator 35. The comparator 35 compares the physical addresses input to the A and B inputs. When these inputs coincide with each other, the comparator 35 outputs a coincidence signal to the controller 40.

The controller 40 receives the signal HIT and the flag SMF1 from the logical address cache memory device 20, the flag SMF2 from the MMU 33, the coincidence signal from the comparator 35, the read control data sent from the CPU 10 through the control bus 14-1, and a memory response RP from the main memory 11, and generates a selection signal SEL, a timing control signal L, read control data MR, or the like. The read control data MR is supplied to the main memory 11 through the control bus 14-2. The controller 40 sets a read/write mode of the logical address cache memory device 20.

Figure 3:
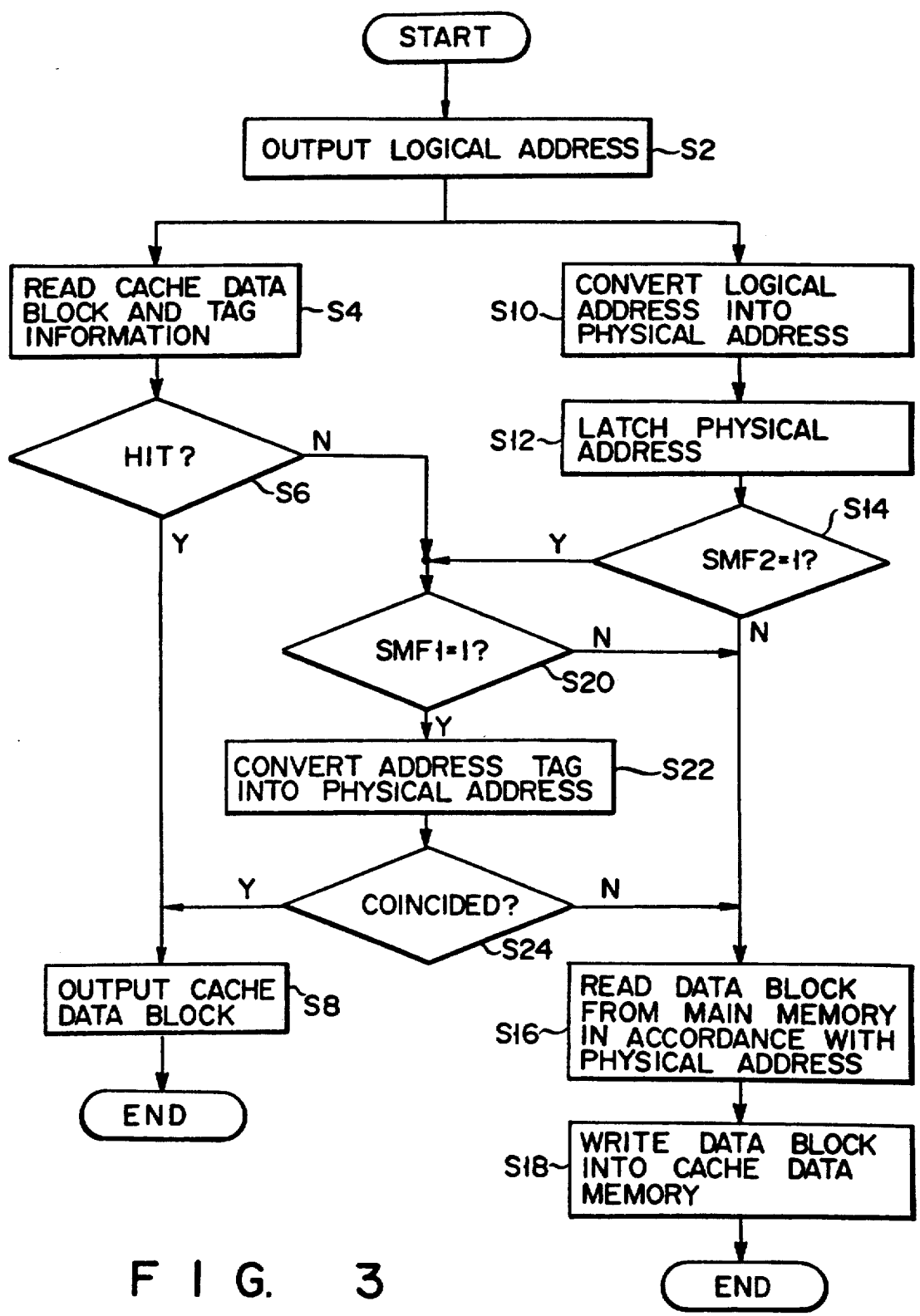
FIG. 3 is a flow chart for explaining an operation of the data processing system shown in FIG. 1.

An operation of the data processing system of this embodiment will be described in detail with reference to FIGS. 2 and 3.

Upon execution of an instruction, when read access of the main memory by the CPU 10 is required, a logical address is output from the CPU 10 onto the address bus 12-1, and the read control data is output onto the control bus 14-1 in step S2. The controller 40 sets the logical address cache memory device 20 in the read mode in response to the read control data. The upper (n−m) bits of the lower logical address (n bits) of the logical address on the address bus 12-1 are latched by the register 27 in the logical address cache memory device 20. The latched address is supplied to the cache data memory 21 and the cache tag memory 22.

In step S4, the cache data block read out from the cache data memory 21 by using as an entry the address latched by the register 27 is latched by the register 23. Tag information is read out from the cache tag memory 22 by using as an entry the address latched by the register 27. The address tag ATAG and the valid bit V of the readout tag information are output to the comparator 24. The shared memory flag SMF1 of the readout tag information is supplied to the controller 40. The upper logical address of the logical address on the address bus 12-1 are also input to the comparator 24. The address tag ATAG is compared with the upper logical tag ATAG is compared with the upper logical address in response to the valid bit V of logic "1" in step S6. If a coincidence is established, the hit signal HIT of logic "1" is output to the controller 40. Otherwise, the signal HIT of logic "0" is output. When the valid bit V is set at logic "0", no comparison operation is performed, and the signal HIT is kept at logic "0". That is, when the valid bit V is set at logic "0", and both the address tag ATAG on the upper logical address do not coincide with each other, the signal HIT is kept at logic "0". The signal HIT is output the controller 40. When the signal HIT is set at logic "1", the operation in step S8 is performed. However, when the signal HIT in set at logic "0", the operation in step S20 is selectively performed.

The cache data block latched by the register 23 is output onto the data bus 13 in response to the signal HIT of logic "1" in step S8. When the signal HIT is set at logic "0", the cache data block is not output onto the data bus 13. That is, when a coincidence between both the addresses is detected in the above comparison operation, the data block corresponding to the logical address appearing on the address bus 12-1 is determined to be present in the cache data memory 21, thereby detecting a cache hit. In this case, the cache data block is read out from the cache data memory 21 and is transferred to the CPU 10 through the data bus 13.

While the logical address is being supplied to the logical address cache memory device 20, the selection control signal SEL is kept at logic "0". In step S10, the upper logical address on the address bus 12-1 is selected by the selector 31 and is supplied to the MMU 33 as an entry of the address conversion table 32. The address conversion table 32 outputs address conversion information corresponding to the upper logical address. The main memory protection information P and the shared memory flag SMF2 of the address conversion information are latched by the register 36. The flag SMF2 is also supplied to the controller 40. The upper physical address PA of the address conversion information is output onto the address bus 12-2 and is linked with the lower logical address on the address bus 12-2 so as to generate a first physical address. In step S12, the first physical address is supplied to the register 34 and is latched in response to the control signal L from the controller 40.

The controller 40 determines in step S14 whether the flag SMF2 is logic "1". If the flag SMF2 is logic "0", the controller 40 determines in step S14 that the physical address area corresponding to the logical address on the address bus 12-1 is not a shared memory area. In step S16, the read control data is output to the main memory 11 as memory access control data MR. In this case, the physical address latched by the register 34 is output onto the address bus 12-2. A data block corresponding to the physical address is read out from the main memory 11 in response to the control data MR, and at the same time the memory response RP is output to the controller 40. The data block is supplied to the CPU 10 through the data bus 13 in response to the response RP. In step S18, the data block is written in the cache data memory 21. The upper logical address from the address bus 12-1 and the shared memory flag SMF2 and the main memory protection information P from the register 36 are written in the cache tag memory 22, and the valid bit V is written by the controller 40.

When the controller 40 determines in step S14 that the flag SMF2 is set at logic "1", the operation in step S20 is performed to check if the flag SMF1 is set at logic "1". If NO in step S20, the operations in steps S16 and S18 are performed, and the data block is read out from the main memory 11 as described above.

If YES in step S20, that is, when a cache miss occurs and both the flags SMF1 and SMF2 are set at logic "1", the controller 40 determines that the physical address area corresponding to the logical address appearing on the address bus 12-1 is a shared memory area. In this case, the second address conversion is started under the control of the controller 40, and the signal SEL is changed from logic "0" to logic "1". Therefore, the address tag ATAG of the tag information read out from the cache tag memory 22 is selected by the selector 31 and is output to the MMU 33. The MMU 33 refers to the address conversion table 32 in accordance with the address tag ATAG and causes the address conversion table 32 to output the upper physical address PA corresponding to the address tag ATAG. The output upper physical address PA is linked with the lower logical address on the address bus 12-2, thereby generating a second physical address. The first physical address latched by the register 34 and the second physical address corresponding to the address tag ATAG are input to the A and B inputs of the comparator 35. The comparator 35 compares the physical addresses input to the A and B inputs and outputs a coincidence/noncoincidence signal (represents coincidence at logic "1") to the controller 40.

In step S24, the controller 40 checks an output signal from the comparator 35 at a predetermined timing upon changing of the signal SEL. If the signal from the comparator 35 represents a coincidence, the controller 40 determines that the logical address area including the logical address on the address bus 12-1 is assigned to the same shared memory area as that of the logical address area represented by the address tag ATAG, and instructs the cache memory device 20 to perform substantially the same operation as in the case of a cache hit. As a result, an operation in step S8 is performed. However, when the signal from the comparator 35 represents a noncoincidence, the controller 40 finally determines a cache miss and accesses the main memory 11 by using the first physical address latched by the register 34 in step S16. More specifically, this access operation is also performed when at least one of the shared memory flag SMF1 from the cache tag memory 22 and the shared memory flag SMF2 from the MMU 33 is false. When at least one of the flags SMF1 and SMF2 is false, change of the signal SEL and the second address conversion in the MMU 33 are not performed, and the main memory 11 is directly accessed.

In order to read out the data block from the main memory 11 upon final decision of the cache miss and store the readout data block in the cache data memory 21, tag information is registered in an entry referred upon decision of the cache miss. The upper logical address of the logical address on the address bus 12-1 is used as the address tag ATAG of the registered tag information. The pieces of information latched by the register 36, i.e., the main memory protection information P and the shared memory flag SMF2 of the address conversation information are used as the main memory flag SMF1.

In the above embodiment, the shared memory flag SMF1 is included in the tag information. However, the shared memory flag SMF1 need not be used. In this case, if the shared memory flag SMF2 of the address conversion information used in address conversation of the logical address on the address bus 12-1, i.e., the first address conversion in the MMU 33 is true, address conversion of the address tag ATAG from the cache tag memory 22, i.e., the second address conversion is performed. The second address conversion is wasted if the logical address area represented by the address tag ATAG is not assigned to a shared memory area. As a matter of course, when the shared memory flag SMF2 of the address conversion information used in the first address conversion is false, the second address conversion is not performed. Therefore, address conversion upon occurrence of a cache miss can be performed at high speed as compared with a scheme for always performing two address conversion operations.

What is claimed is:

1. A data processing system comprising:
    main memory means including a plurality of memory areas each having a predetermined size, each memory area being assigned with one physical address area, at least one of said plurality of physical address areas corresponding to a plurality of logical address areas, a physical address including an upper and a lower physical address, a logical address including an upper and a lower logical address, said lower physical address being equal to said lower logical address;
    cache means for storing a plurality of cache data blocks and a plurality of tag address blocks, each of said tag address blocks corresponding to each of said plurality of cache data blocks, respectively, for storing a first cache data block and a first tag address block in accordance with part of said lower logical address of an input logical address, and for determining whether said tag address and said logical address is subjected to a cache hit;
    physical address coincidence detecting means, including an address conversion table for storing a plurality of address conversion information blocks, each address conversion information block including said upper physical address and a first flag, for referring to said address conversion table in accordance with said upper logical address of said input logical address, thereby obtaining a first upper physical address to generate a first physical address from said obtained first upper physical address and said lower logical address, referring to said address conversion table in accordance with said tag address from said cache memory means, thereby obtaining a second upper physical address to generate a second physical address from said obtained second upper physical address and said lower logical address, and comparing said first and second physical addresses; and
    access control means for determining whether or not a physical address corresponding to said tag address designates said shared memory area, when said cache means does not determine said occurrence of said cache hit and when said first physical address designates said shared memory area, accessing said cache data blocks stored in said cache means when it is determined that said physical address corresponding to said tag address designated said shared memory area, for determining whether or not said physical address corresponding to said tag address designated said shared memory area, when said cache means does not determine said occurrence of said cache hit and when said first physical address designates said shared memory area, said second means accessing said main memory means when it is determined that said physical address corresponding to said tag address does not designate said shared memory area, and for accessing said main memory means without determining whether or not said physical address corresponding to said tag address designates said shared memory area, when said cache means does not determine said occurrence of said cache hit and when said first physical address does not designate said shared memory area.

2. A system according to claim 1, wherein said tag information block includes a second flag representing whether said physical address area corresponding to said tag address corresponds to said shared memory area; and said access control means further comprises means for inhibiting said physical address coincidence detecting means from an operation referring to said address conversion table according to said tag address, and from an operation of coincidence detection when said cache hit is not detected by said cache means and said tag address is determined from said second flag not to correspond to said shared memory area.

3. A system according to claim 1, wherein said cache means further comprises means for writing said first flag in said corresponding tag information block as said second flag.

4. A data processing system for effectively converting a logical address into a physical address, comprising:

main memory means for storing data blocks, said main memory means including a plurality of memory areas, each of which corresponds to one physical address area, at least one of said plurality of physical address areas being a shared memory area corresponding to a plurality of logical address areas;

address converting means for converting an input first logical address into a first physical address and for outputting a first flag when said first logical address is converted into said first physical address;

determination means for determining whether a first physical address area which is designated by said first physical address is said shared memory area based on said first flag;

cache means for storing a plurality of cache data blocks and a plurality of tag information blocks, each of said tag information blocks corresponding to each of said cache data blocks, respectively, each of said tag information blocks including an upper logical address, and for determining whether a cache hit occurs by comparing a first upper logical address of said first logical address and a second upper logical address of a first tag information block corresponding to said first logical address;

first means for determining whether or not a physical address corresponding to said tag information designates said shared memory area, when said cache means does not determine said occurrence of said cache hit and when said determination means determines that said first physical address designates said shared memory area, said first means accessing said cache data blocks stored in said cache means when it is determined that said physical address corresponding to said tag information designates said shared memory area;

second means for determining whether or not said physical address corresponding to said tag information designated said shared memory area, when said cache means does not determine said occurrence of said cache hit and when said determination means determines that said first physical address designates said shared memory area, said second means accessing said main memory means when it is determined that said physical address corresponding to said tag information does not designate said shared memory area; and third means for accessing said main memory means without determining whether or not said physical address corresponding to said tag information designates said shared memory area, when said cache means does not determine said occurrence of said cache hit and when said determination means determines that said first physical address does not designate said shared memory area.

5. A system according to claim 4, wherein said address converting means includes:

an address conversion table for storing first address conversion information including a first upper physical address and said first flag; and means for referring to said address conversion table in accordance with said first logical address, reading out said first address conversion information, outputting said first flag to said determination means, and generating said first physical address from said first upper physical address and a first lower logical address of said first logical address, said first physical address including said first upper physical address and a first lower physical addresses, said first logical address including said first upper and lower logical addresses, said first lower logical address being equal to said first lower physical address.

6. The system according to claim 4, wherein said memory storing an address conversion table includes:

an address conversion table for storing first address conversion information including a first upper physical address and said first flag; and an access circuit for referring to said address conversion table in accordance with said first logical address, reading out said first address conversion information, outputting said first flag to said determination circuit, and generating said first physical address from said first upper physical address and a first lower logical address of said first logical address, said first physical address including said first upper physical address and a first lower physical address, said first logical address including said first upper and lower logical addresses, said first lower logical address being equal to said first lower physical address.

7. A system according to claim 4, wherein said cache means comprises:

cache data memory means for storing said plurality of cache data blocks;

tag memory means for storing said plurality of tag information blocks;

means for referring to said cache data memory means according to said first logical address and reading out a first cache data block associated with said logical address; and means for outputting said first cache data block upon determining said cache hit.

8. A system according to claim 7, wherein said cache means further comprises means for reading out said first tag information block from said cache tag memory means according to said first logical address, and for outputting said second upper logical address to said address converting means;

said address converting means further includes means for converting said second upper logical address into a second physical address when said cache means determines that said cache hit did not occur;

said system further comprises means for comparing said first and second physical addresses; and said access means comprises means for accessing said main memory means according to said first physical address when said first and second physical addresses do not coincide upon comparison by said comparing means.

9. A system according to claim 7, wherein said cache means further comprises means for reading out said first tag information block from said cache tag memory means according to said first logical address and for outputting said second upper logical address to said address converting means, said second tag information block including said second upper logical address and a second flag; and means for outputting said second flag to said access means; and said access means comprises means for inhibiting an operation for causing said address converting means to convert said second upper logical address into a second physical address and for accessing said main memory means in accordance with said first physical address when said physical address area corresponding to said second upper logical address is determined to correspond to said shared memory area based on said second flag.

10. A system according to claim 9, wherein said address converting means further includes means for outputting said first flag when said first logical address is converted into said first physical address.

11. A system according to claim 10, wherein said address converting means includes:

an address conversion table for storing first address conversion information including a first upper physical address and said first flag; and means for referring to said address conversion table in accordance with said first logical address, reading out said first address conversion information, outputting said first flag to said determination means, and generating said first physical address from a first upper physical address and a first lower logical address of said first logical address, said first physical address including said first upper physical address and a first lower physical address, said first logical address including said first upper and lower logical addresses, said first lower logical address being equal to said first lower physical address.

12. A data processing system for effectively converting a logical address into a physical address, comprising:

a main memory for storing data blocks, said main memory including a plurality of memory areas, each of which corresponds to one physical address area, at least one of said plurality of physical address areas being a shared memory area corresponding to a plurality of logical address areas;

a memory storing an address conversion table for converting an input first logical address into a first physical address and for outputting a first flag when said first logical address is converted into said first physical address;

a determination circuit for determining whether a first physical address area which is designated by said first physical address is said shared memory area based on said first flag;

a cache memory for storing a plurality of cache data blocks and a plurality of tag information blocks, each of said tag information blocks corresponding to each of said cache data blocks, respectively, each of said tag information blocks including an upper logical address, and for determining whether a cache hit occurs by comparing a first upper logical address of said first logical address and a second upper logical address of a first tag information block corresponding to said first logical address; and a controller for determining whether or not a physical address corresponding to said tag information designates said shared memory area, when said cache means does not determine said occurrence of said cache hit and when said determination circuit determines that said first physical address designates said shared memory area, said first means accessing said cache data blocks stored in said cache memory when it is determined that said physical address corresponding to said tag information designates said shared memory area, for determining whether or not said physical address corresponding to said tag information designated said shared memory area, when said cache memory does not determine said occurrence of said cache hit and when said determination means determines that said first physical address designates said shared memory area, accessing said main memory means when it is determined that said physical address corresponding to said tag information does not designate said shared memory area, and for accessing said main memory without determining whether or not said physical address corresponding to said tag information designates said shared memory area, when said cache memory does not determine said occurrence of said cache hit and when said determination circuit determines that said first physical address does not designate said shared memory area.

13. The system according to claim 12, wherein said cache memory comprises:

a cache data memory for storing said plurality of cache data blocks;

a tag memory for storing said plurality of tag information blocks;

an access circuit for referring to said cache data memory means according to said first logical address and reading out a first cache data block associated with said logical address; and an output circuit for outputting said first cache data block upon determining said cache hit.

14. The system according to claim 13, wherein said cache memory further comprises a read circuit for reading out said first tag information block from said cache tag memory according to said first logical address, and for outputting said second upper logical address to said address conversion table;

said memory storing an address conversion table further includes an address conversion table for converting said second upper logical address into a second physical address when said cache means determines that said cache hit did not occur;

said system further comprises a comparator for comparing said first and second physical addresses; and said access circuit comprises an access circuit for accessing said main memory according to said first physical address when said first and second physical addresses do not coincide upon comparison by said comparator.

15. The system according to claim 14, wherein said cache memory further comprises a read circuit for reading out said first tag information block from said cache tag memory according to said first logical address and an output circuit for outputting said second upper logical address to said address conversion table, said second tag information block including said second upper logical address and a second flag, and an output circuit for outputting said second flag to said access circuit; and said access circuit comprises an inhibiting circuit for inhibiting an operation for causing said address conversion table to convert said second upper logical address into a second physical address and for accessing said main memory in accordance with said first physical address when said physical address area corresponding to said second upper logical addresses determined to correspond to said shared memory area based on said second flag.

16. The system according to claim 15, wherein said memory storing an address conversion table further includes an output circuit for outputting said first flag when said first logical address is converted into said first physical address.

17. The system according to claim 16, wherein said memory storing an address conversion table includes:

an address conversion table for storing first address conversion information including a first upper physical address and said first flag; and an access circuit for referring to said address conversion table in accordance with said first logical address, a read circuit for reading out said first address conversion information, an output circuit for outputting said first flag to said determination circuit, and a generator for generating said first physical address from a first upper physical address and a first lower logical address of said first logical address, said first physical address including said first upper address and a first lower physical address, said first logical address including said first upper and lower logical address, said first lower logical address being equal to said first lower physical address.

* * * * *